(12) United States Patent
Lin et al.

(10) Patent No.: US 7,374,117 B2
(45) Date of Patent: May 20, 2008

(54) CONTAINER OF A BLENDER

(76) Inventors: Kou-I Lin, P.O. Box 166-13, Taipei (TW) 115; Rong-Yuan Tseng, P.O. Box 166-13, Taipei (TW) 115

( * ) Notice: Subject to any disclaimer, the term of this patent is extended or adjusted under 35 U.S.C. 154(b) by 60 days.

(21) Appl. No.: 11/260,363

(22) Filed: Oct. 28, 2005

(65) Prior Publication Data
US 2007/0095961 A1    May 3, 2007

(51) Int. Cl.
*A47J 43/25* (2006.01)
(52) U.S. Cl. .............................. 241/273.3; 241/273.4; 241/282.1
(58) Field of Classification Search .......... 241/282.1, 241/282.2, 273.3, 273.4
See application file for complete search history.

(56) References Cited
U.S. PATENT DOCUMENTS
1,561,401 A * 11/1925 Bembina ................. 241/273.4

6,786,440 B2 * 9/2004 Ling et al. ................. 241/301

FOREIGN PATENT DOCUMENTS
TW        580899        3/2004

* cited by examiner

*Primary Examiner*—Mark Rosenbaum

(57) ABSTRACT

The present invention is aimed to provide a container of the blender. It can prevent the inner wall of the container from abrasions and blemishes. Further, the time-consuming for fibers of the fruit and vegetable being grated and chopped can be reduced. The container of the blender includes a cup, a lining mounted inside the cup characterized in that the lining as a shield screen on the inner wall of the cup, the inner wall of the lining has a number of teeth projected thereof for grating the fibers of the vegetable and fruit.

10 Claims, 7 Drawing Sheets

CONTAINER OF A BLENDER

FIELD OF THE INVENTION

The present invention relates to the container of the blender, particularly to a set of high-speed blades mounted inside the lower portion of the container.

GROUND OF THE INVENTION

The usage of blender become popular today; the configuration structure of a blender is mainly a set of rotatable blades disposed inside the container to mix the ice cubes, vegetables and fruits until they become liquid.

In early phases, the container of the blender was made of glass. The user began to operate with a glass container, somehow a glass break detector, if any, was needed by manufacturers to know whether the glass container was broken a little or not, in view of the fractures or cracks happened to occur on the glassware due to impacts or collisions. Density-dependent factors such as to expand when hot to shrink when cold also caused the glass surfaces to expand or shrink disproportionately and then cracks began to occur. Persons skilled in the art provided reinforced plastic such as acrylic resin to manufacture the container of the blender instead of the glassware. Because the reinforced plastic was not only light weight but also cost efficient, durable and rigid, they were attractive raw materials cherished by the manufacturers and consumers. But the containers made of reinforced plastic, during longer time period usage, the inner wall was impacted or collided intermittently by the stirred objects, eventually it resulted in nicks. Debris of the scraped acrylic resin was possibly mixed into the liquid. Once the debris remained in the liquid got drunk by consumers led to a poor hygiene condition. In fact the manufacturers provided a container made simply from a reinforced plastic hardly complied with all hygienic rules. The inventors of the present invention encounter the problems as mentioned above, provide a metal lining (cylindrical member) to shield the inner wall of the receptacle, which is known by their patent document 1.

Patent Document 1: TW580,899 entitled "container for blender" assigned to the inventors Kou-I Ling and Rong-Yuan Tseng of the present invention on 21 Mar. 2004, the same is also patented in the USA assigned patent number as U.S. Pat. No. 6,786,440 on 7 Sep. 2004.

Discussion About Prior Arts

As shown in FIG. 1, a conventional blender having a cup (1), a set of blades (3) installed within the base of cup (1). When blades (3) are rotated in high speed, the vegetable and fruit will be grated until they become liquid as well as a whirlpool is formed in the receptacle, which is illustrated and indicated by spiral arrows as shown in FIG. 2. But the whirlpool (4) in usual brings the rough and long fibers (41) to the outer circle in contact with the inner wall by centrifugal force. In other words, by centrifugation the rough and long fibers (41) is not swirl into the center of the whirlpool (4) but whirl around the outer circle thereof. Some rough and long fibers (41) are neither brought to the lower portion of the cup (1) by whirlpool (4) nor further being grated by the blades (3). It could not catch one's sense when drinking juice with rough and long fibers are not liquefied efficiently. A spoon may be inserted into the whirlpool (4) or the stirring time is prolonged to grate the rough and long fibers. As a result, for a longer time period, the grated fibers immersed in the liquid are stirred to a foam with bubbles, this "oxidization" activity exposed in the air is going to influence the bright color and luster of the juice. The nutrition will be lost; the active fiber basis vitamins will be destroyed. The same problems happened to occur in the cited patent document 1. Accordingly, a metal lining combined to the inner wall of the cup (1) as a shield reduces the stirring time for promptly providing juice catches the user's sense. That is the key point of the present invention.

SUMMARY OF THE INVENTION

Accordingly, the present invention is aimed to provide a container of the blender comprises a cup (1) and a lining (2) disposed inside the cup (1) characterized in that the lining (2) is formed as a shield inside the cup (1), a number of teeth (21) projected from the inner wall of the lining (2) for grinding the fibers of vegetable and fruit.

The lining (2) is selected from one of the following: metal lining, glass lining, lining has approximately the same hardness.

Several vertical ribs (11) projected from the inner wall of the cup (1), several vertical stopper members (22) formed on the inner wall of the lining (2) which are corresponding to the vertical ribs (11), the ribs (11) are received into the hollowed trough of the stopper members (22).

A number of teeth (21') are arranged on and projected up from the top end of the stopper members.

The rib (11) has a vertical facet (111), and the stopper member 22 has a vertical facet (221).

The lining (2) is selected from one of the following: half-mask, whole mask.

The half-mask lining is combined to the cup (1) by injection modeling.

The half-mask lining is mounted inside the cup (1), the top rim of the lining (2) has lip (26).

The half-mask lining is mounted inside the cup (1), several prop stands (24) extended from the top rim of the lining (2), a horizontal ring is connected to the top portion of the prop stands (24).

The half-mask lining is mounted inside the cup (1), the top rim of the lining (2) has horizontal ring extended radially outwardly.

The lining (2) is selected from one of the following: integrally formed as a whole annular lining, a number of lining pieces (2a), or (2b) combined to form an annular lining.

The first facet of the stopper member (22) is bended inward to form a buckled piece (222), the buckled piece (222) leads into a groove (113) defined on the first facet of the rib (11), the second facet of the lining pieces (22) is a flat facet directly leads into a trench (112) defined on the second facet of the rib (11) of the cup (1).

Effects and Mechanisms of the Present Invention

The advantages can be achieved from practicing of the present invention as following:

The rigid lining (2) shields the inner wall of the receptacle from collision of rigid material, but the fibers remained in the teeth (21) on the inner wall of the lining can be ground and cut into pieces. Therefore, the duration of grating fruit and vegetable can be reduced, the related "oxidization" activity of the juice exposed in air will also be decreased; rather, the bright color and luster of the juice can be kept vividly. The nutrition will not be lost, further the active fiber basis vitamins and sense of smell is kept as a freshener.

DETAILED DESCRIPTION OF THE PREFERRED EMBODIMENT

First Embodiment

Figure 1:
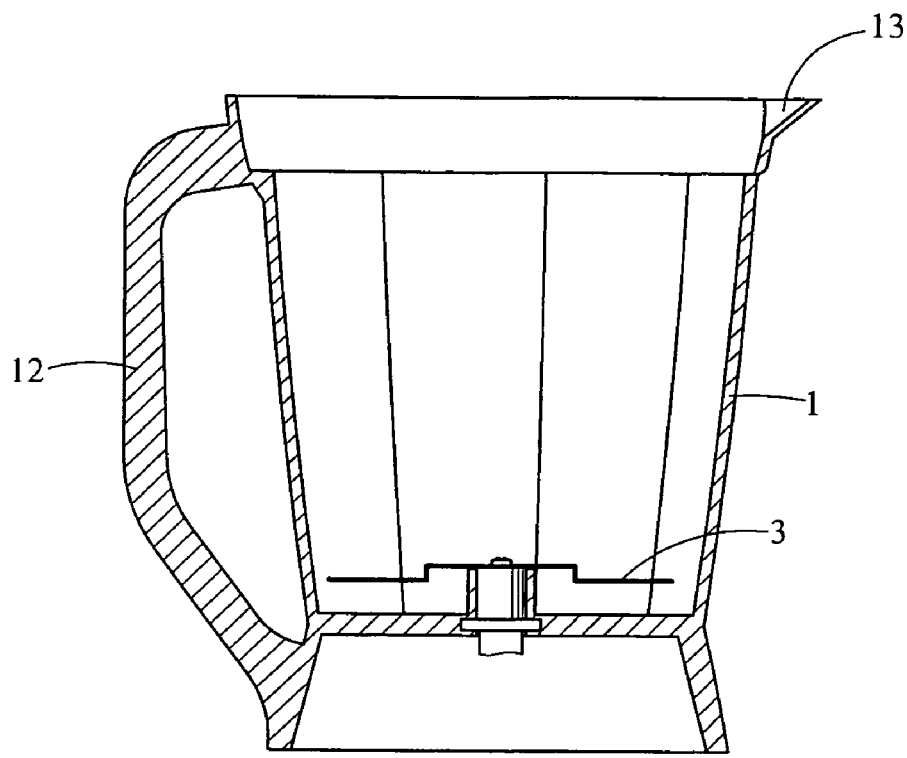
FIG. 1: a cross sectional view of the prior art, a conventional container of the blender.
Figure 2:
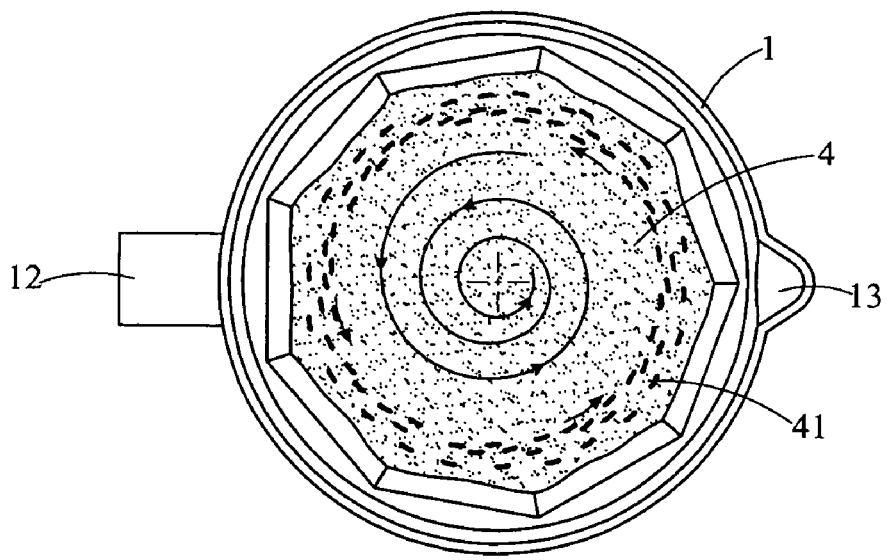
FIG. 2: a top plan view of FIG. 1.
Figure 3:
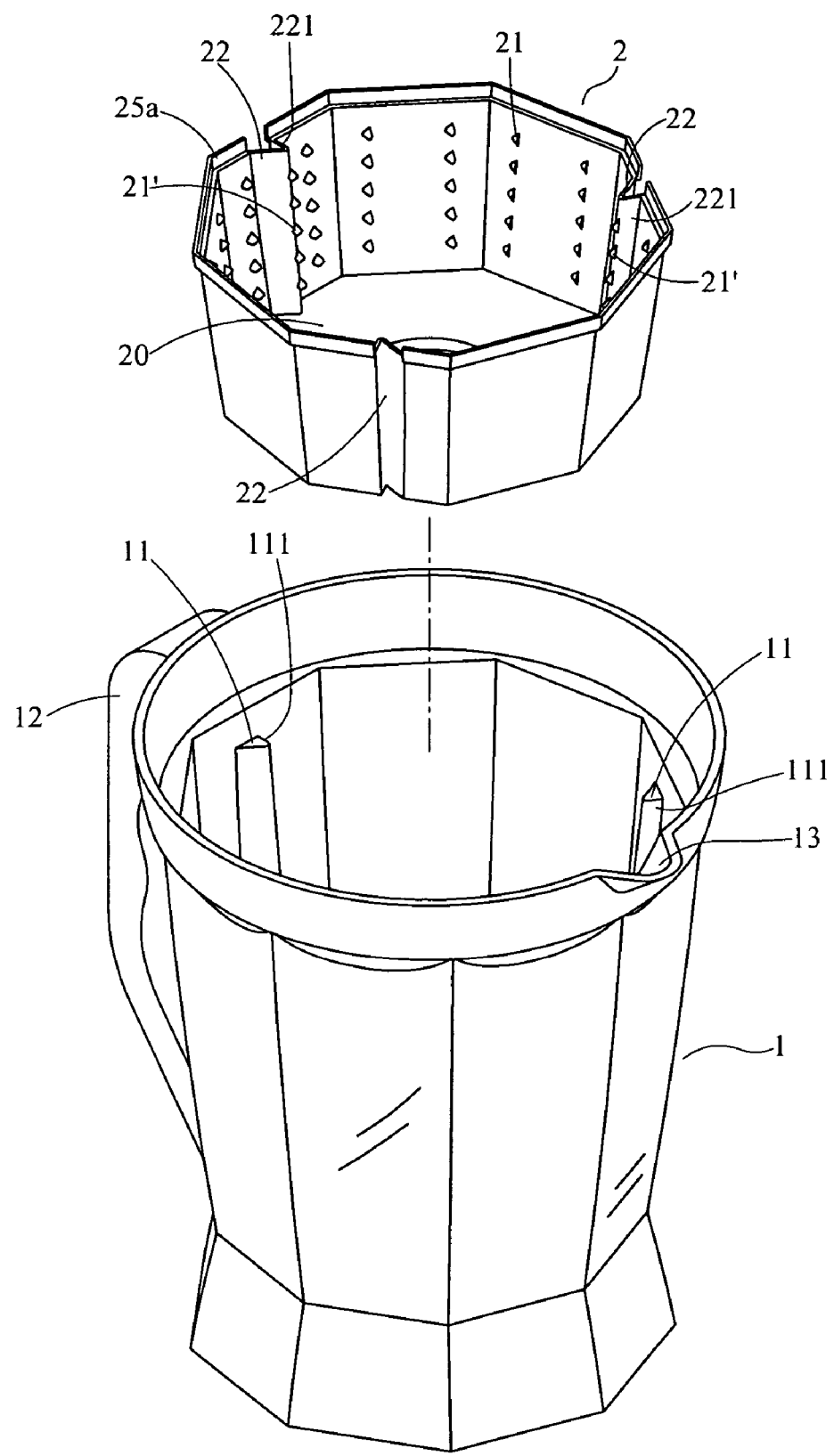
FIG. 3: an exploded view of the receptacle of the juicer according to the first embodiment of the present invention.
Figure 4:
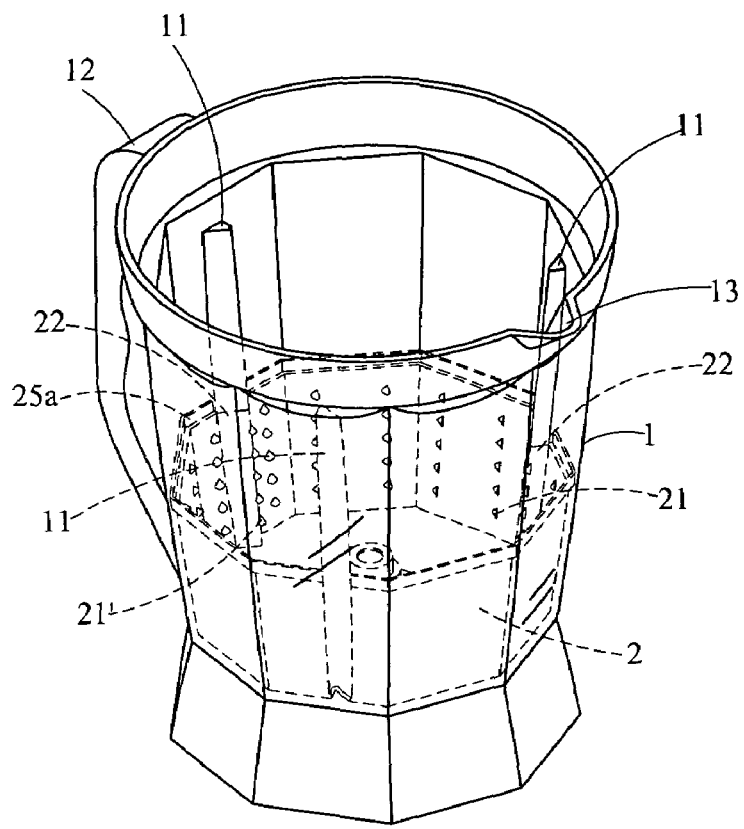
FIG. 4: an assembled view of the container of FIG. 3.
Figure 5:
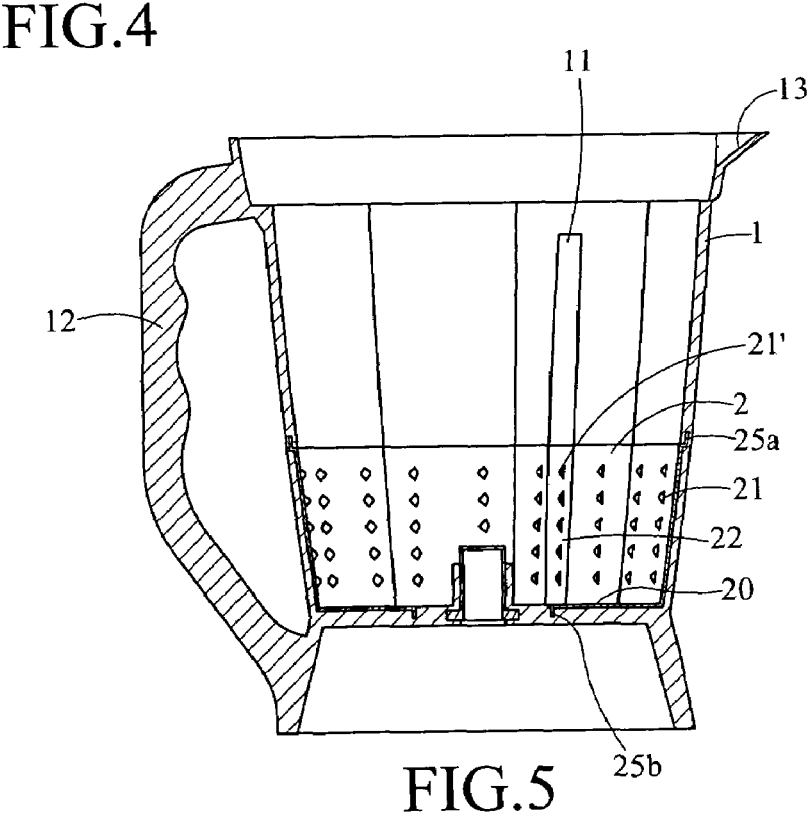
FIG. 5: a cross sectional view of FIG. 3.

As shown in FIG. 3, the present invention is a container includes a cup (1), a rigid lining (2) mounted inside the cup (1). The lining (2) is a prefabricated component combined to the cup (1) by injection molding. In other words, the lining (2) is first placed in the mode and then a transparent or translucent acrylic cup (1) is formed to wrap over the circumference of the lining (2) integrally as a whole by injection molding; finally, they are never detached from each other.

Figure 13:
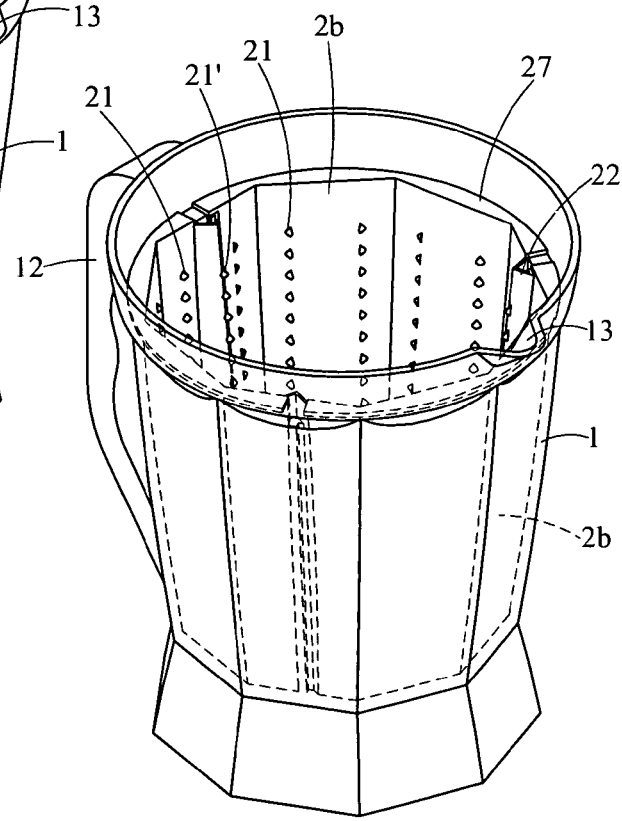
FIG. 13: an assembled view of FIG. 12.

Lining (2) is shaped as a half-mask, that is, the lining (2) only shields the lower half portion of the cup (1) but the upper half portion of the cup (1) is not shielded by the lining (2). Users can see vegetable or fruit cubes are whipped or thrashed in the cup (1). If the lining (2) is shaped as a whole-mask (as shown in FIG. 13), the upper and lower half portions of the cup are shielded by the lining (2). Users only look down on the vegetable or fruit cubes whipped or thrashed in the cup (1).

Lining (2) is combined to the inner wall of the cup (1) to form a shield screen characterized in that a number of teeth (21) projected from the inner wall of the lining (2) applied to grate fibers of vegetable and fruit. Teeth (21) can be arranged in parallel with one another, but they are all arrayed in alignment with each other finally to form a crossed or columned shape of teeth array. Rather, the lining (2) can be made of metal, glass, alloy, or non-alloy material, which is with a hardness rather rigid than the acrylic cup (1). Lining (2) is an annular member formed integrally as a whole one, but which is preferred in the shape of polygon. A lining base (21) can be added to the bottom of the cap (1) as a shield screen thereof. The top end of the lining (2) has an L type wall (25a) bended outward and upward, the bottom end of the lining (2) has an L type wall (25b) bended inward and downward respectively. Both L type walls (25a, 25b) are embedded into the inner wall of the cup (1) to eliminate the permeation of liquid through a chink on the wall.

Cup (1) has a handle (12) and a spout (13). Several vertical ribs (11) are protruded from the inner wall of the cup (1); several vertical stopper members (22) corresponding to the ribs (11) are also formed on the obverse side of the wall of the lining (2), hollowed troughs opposed to the stopper members (22) are formed on the reverse side of the wall of the lining (2), the hollowed troughs are suitable for matching up and receiving the vertical rib (11).

Figure 6:
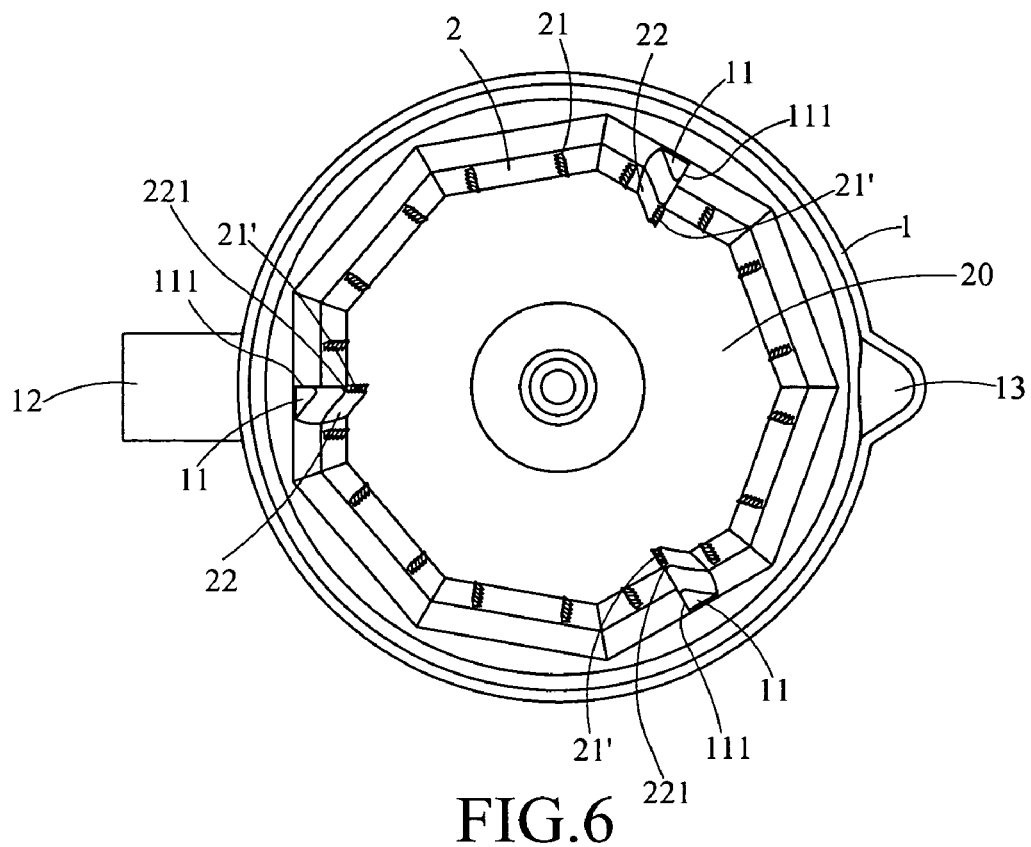
FIG. 6: a top plan view of FIG. 3.
Figure 7:
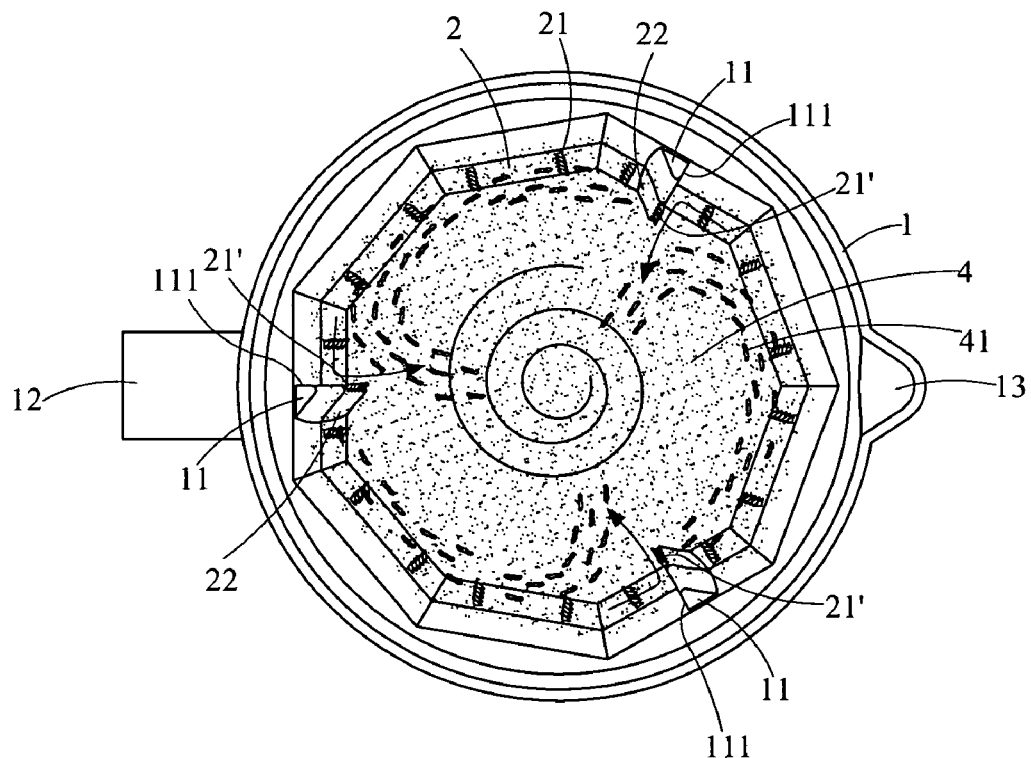
FIG. 7: a schematic view of FIG. 3.

As shown in FIG. 6, look down on the cup (1), and the lining (2), a facet (111) of the rib (11) and a facet (221) of the stopper members (22) can be formed as perpendicular spoilers which dampen vibration of the vegetable and fruit fibers (as shown in FIG. 7) but sweep them in the whirlpool (4) as much as possible to the center thereof; and then to the lower half portion of the cup (1) being crumbled by the straight blades. But only a few rough and long fibers (41) are forced into the center of the whirlpool, most of them still left outside the inner circle of the whirlpool (4).

As shown in FIG. 7, when the straight blades (not shown) is rotated in high speed, rough and long fibers (41) in the whirlpool (4) remained in the teeth (21) on the surrounding inner wall of the lining (2) will soon be grated and chopped into pieces. Possibility of the rough and long fibers being grated is greatly improved. Though the fibers all are not easily forced into the whirlpool center at once, they can be chopped into pieces by the teeth (21) as well. Therefore, the duration for the blender stirring the chopped fibers is reduced; meanwhile, possibility of oxidization of the stirred juice is also reduced. Rather, the top end of the stopper members (22) has a number of teeth (21') projected up thereof, by means of the projected teeth (21'), the fibers of vegetable and fruit can be further grated and chopped into pieces. The teeth (21') projected up from the top end of the stopper members (22) are advantageous to the grinding.

Second Embodiment

Figures 8, 9:
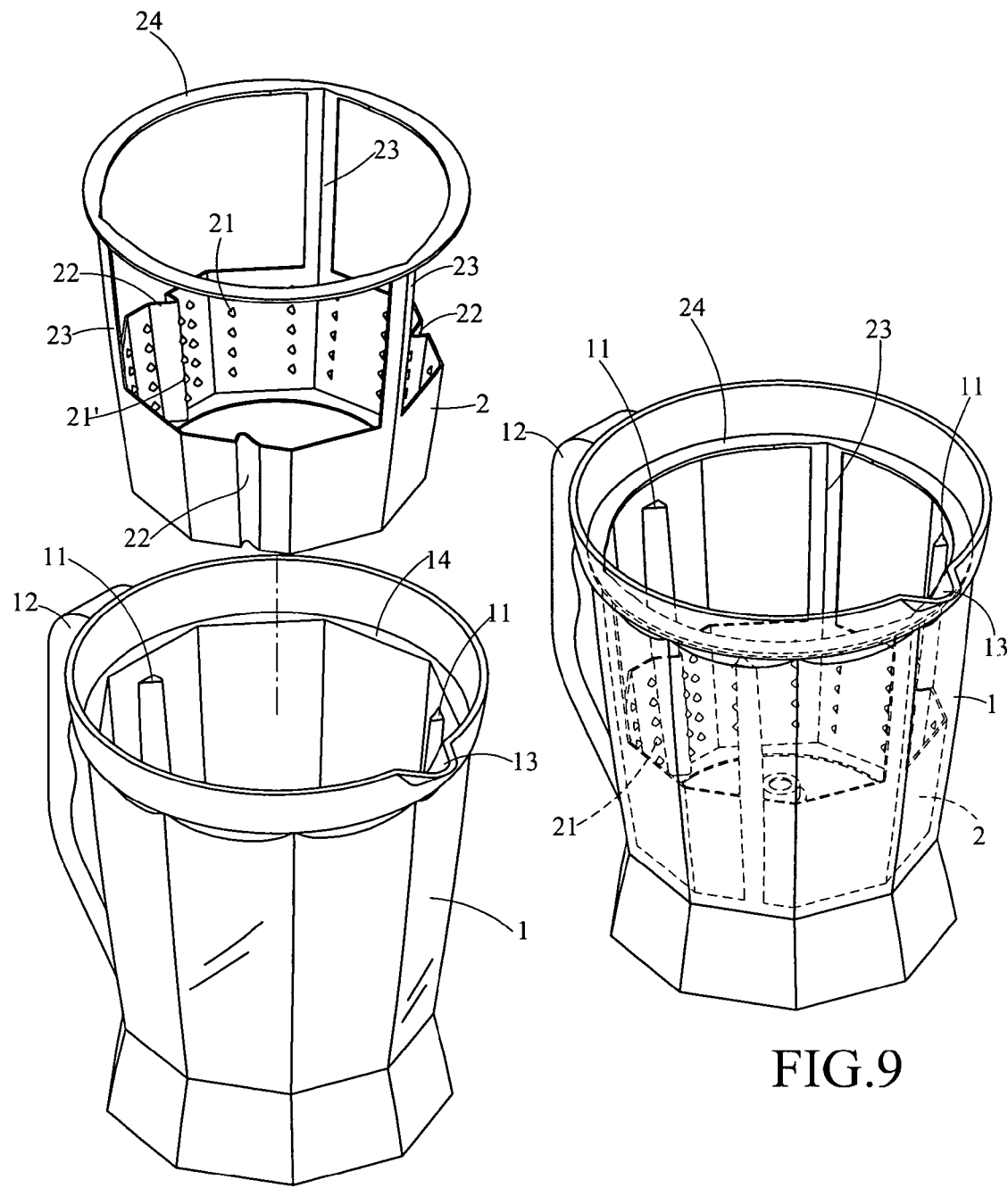
FIG. 8: an exploded view of the container of the blender according to the second embodiment of the present invention.
FIG. 9: an assembled view of FIG. 8.

As shown in FIG. 8, the container of the blender includes a cup (1), and a rigid lining (2) mounted inside the cup (1). First, each of the cup (1) and lining (2) are prefabricated components, and then the lining (2) is mounted inside the cup (1) and combined to the cup (1) integrally as a whole. After combination, the assembled view of the container is illustrated as shown in FIG. 9.

The lining (2) is shaped as a half-mask. But several prop stands (23) extended from the top rim of the hood (2) to a height adjacent to the top rim of the cup (1), a horizontal ring (24) is connected to the top ends of the prop stands (23). The horizontal ring (24) is convenient for the users to hold, and when the lining (2) is mounted inside the cup (1), the horizontal ring (24) placed on the L-shape (i.e. like a top step of a ladder) top rim of the container which is suitable for a lid (not shown) capped over the container, then the horizontal ring (24) is sandwiched between the container and the lid. Therefore the lining (2) can be mounted inside the container without any movements.

Third Embodiment

Figure 10:
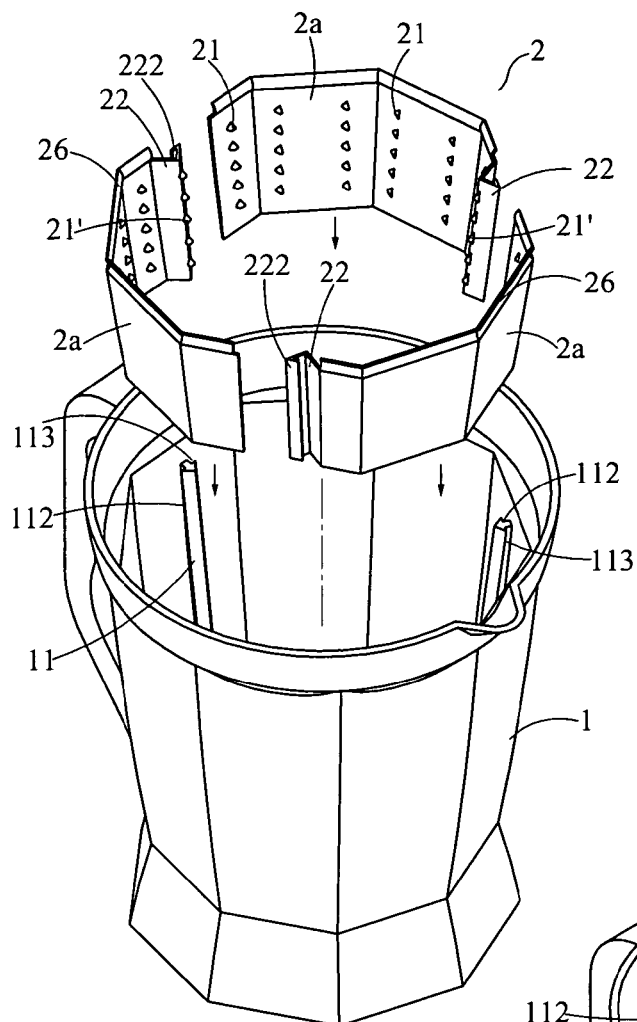
FIG. 10: an exploded view of the container of the third embodiment of the present invention.
Figure 11:
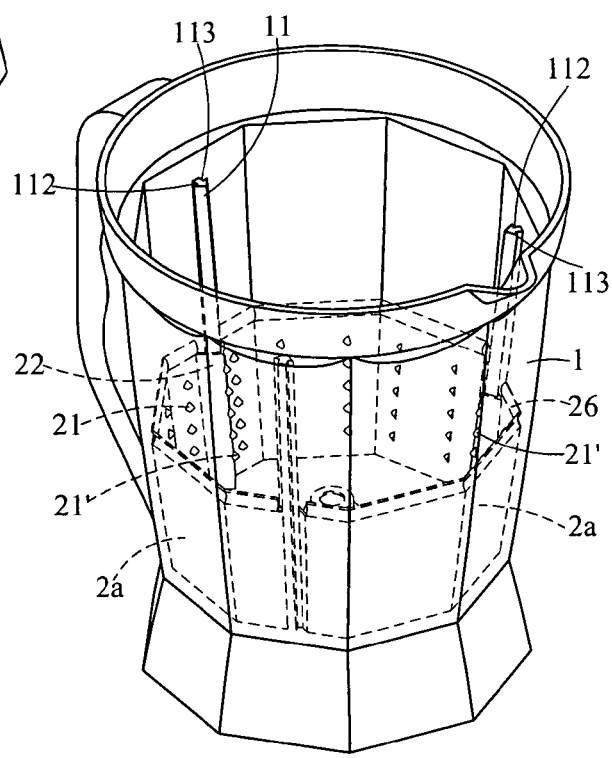
FIG. 11: an assembled view of FIG. 10.

As shown in FIG. 10, the container of the blender includes a cup (1), and a rigid lining (2) mounted inside the cup (1). The cup (1) and the lining (2) are prefabricated separately, and then the lining (2) is embedded into the cup (1) and combined to the cup (1) integrally as a whole. After combination, the assembled view is illustrated as shown in FIG. 11.

The lining (2) is shaped as a half mask, which is composed of a number of lining pieces (2a). A stopper member (22) is formed on the obverse side of the lining piece (2a) as well as the teeth (21) are arrayed on the same side. The first facet of the stopper member (22) is bended inward to form a buckled piece (222). A groove (113) is defined on the first facet of the rib (11) of the cup (1), the buckled piece (222) can be led into the groove (113) in place and then the rib (11) enclosed inside the hollowed trough formed on the reverse side of the stopper member (22). The second facet of the lining pieces (22) is a flat facet directly leads into a trench (112) defined on the second facet of the rib (11) of the cup (1). A number of teeth (21') can also be arranged on the top end of stopper member (22). Rather, the lip (26) is extended radially outwardly from the top rim of the lining pieces (2a) is convenient for the user to hold when the lining pieces (2a) are assembled or disassembled with each other.

Fourth Embodiment

Figure 12:
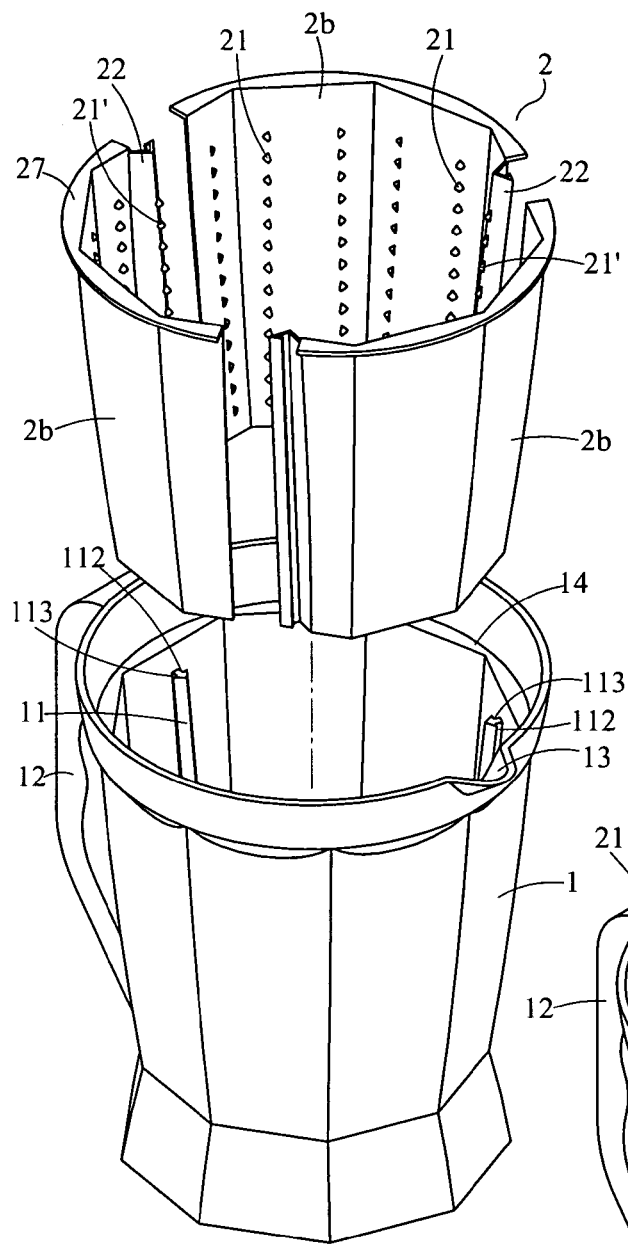
FIG. 12: an exploded view of the container of the fourth embodiment of the present invention.

As shown in FIG. 12, the container of the blender includes a cup (1), and a rigid lining (2) mounted inside the cup (1). The cup (1) and the lining (2) are prefabricated components. The lining (2) is embedded into the cup (1) and then combined to the cup (1) integrally as a whole. After combination, the assembled view is illustrated as shown in FIG. 13.

The lining (2) is shaped as a whole mask. The lining (2) is composed of a number of lining pieces (2b), but the top rim of the lining (2) is bended outward to form a horizontal ring (27). The horizontal ring (27) is not only convenient for the user to hold to assemble or disassemble the lining pieces (2b), but the horizontal ring (27) can be placed on the top step of the ladder like top rim of the container so as the horizontal ring (27) can be sandwiched between the cup (1) and the lid (not shown) without any movements.

What is claim claimed:

1. A container of the blender comprises a cup (1) and a lining (2) disposed inside the cup (1) characterized in that the lining (2) is formed as a shield inside the cup (1), a number of teeth (21) projected from the inner wall of the lining (2) for grating the fibers of vegetable and fruit; wherein the lining is a half mask, the half-mask lining is mounted inside the cup (1), several prop stands (24) extend from the top rim of the lining (2), a horizontal ring (21) is connected to the top portion of the prop stands (24).

2. A container of the blender according to claim 1, wherein the lining (2) is selected from one of the following: metal lining, glass lining.

3. A container of the blender according to claim 1, wherein several vertical ribs (11) projected from the inner wall of the cup (1), several vertical stopper members (22) formed on the obverse side of the lining (2) corresponding to the vertical ribs (11), the ribs (11) are matched up and received into the hollowed trough formed on the reverse side of the stopper members (22).

4. A container of the blender according to claim 3, wherein a number of teeth (21') are arranged on and projected from the top end of the stopper members.

5. A container of the blender according to claim 3, wherein each rib (11) has a vertical facet (111), and each stopper member (22) has a vertical facet (221).

6. A container of the blender according to claim 1, wherein the half-mask lining is combined to the cup (1) by injection modeling.

7. A container of the blender according to claim 1, wherein the half-mask lining is mounted inside the cup (1), the top rim of the lining (2) has lip (26).

8. A container of the blender according to claim 1, wherein the half-mask lining is mounted inside the cup (1), the top rim of the lining (2) has horizontal ring extended radially outwardly.

9. A container of the blender according to claim 1, wherein the lining (2) is selected from one of the following: integrally formed as a whole annular lining, a number of lining pieces (2a), or (2b) combined to form an annular lining.

10. A container of the blender according to claim 9, wherein the lining pieces (2a, 2b) are combined to form as a vertical stopper member (22), the first facet of the stopper member (22) is bended inward to form a buckled piece (222), the buckled piece (222) lead into a groove (113) defined on the first facet of a rib (11), the second facet of the lining pieces (22) is a flat facet directly lead into a trench (112) defined on the second facet of the rib (11) of the cup (1).

* * * * *